T. N. ROBINSON.
SAFETY HOOK.
APPLICATION FILED JAN. 24, 1918.
1,291,673.
Patented Jan. 14, 1919.
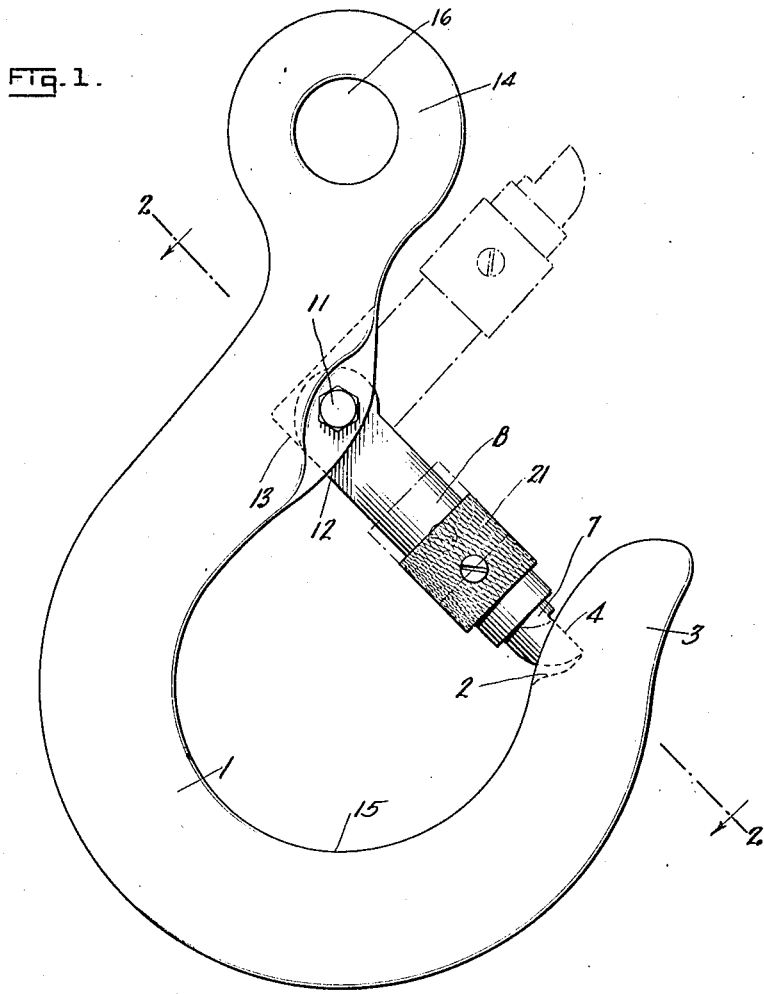
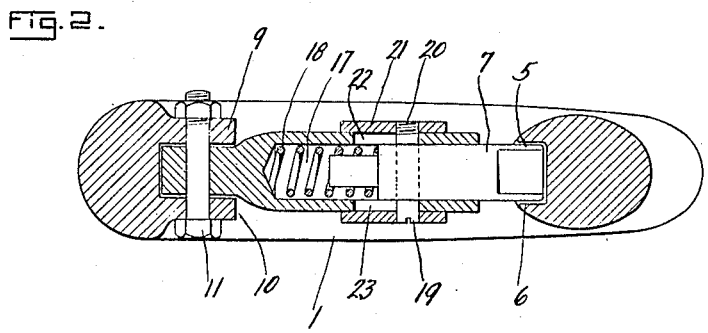
WITNESSES
INVENTOR
Thomas N. Robinson
BY
ATTORNEYS

UNITED STATES PATENT OFFICE.

THOMAS NELSON ROBINSON, OF NEW YORK, N. Y., ASSIGNOR OF FORTY ONE-HUNDREDTHS TO GEORGE BRENNAN, OF NEW YORK, N. Y.

SAFETY-HOOK.

1,291,673.

Specification of Letters Patent.

Patented Jan. 14, 1919.

Application filed January 24, 1918. Serial No. 213,506.

*To all whom it may concern:*

Be it known that I, THOMAS N. ROBINSON, a citizen of the United States, and a resident of the city of New York, Astoria, borough of Queens, in the county of Queens and State of New York, have invented a new and Improved Safety-Hook, of which the following is a full, clear, and exact description.

This invention relates to hooks used in hoisting or handling articles of considerable weight in a given position, and has for an object the provision of an improved construction whereby the hook cannot become accidentally disengaged.

Another object in view is to provide a hook with a safety catch arranged to extend from near the shank to near the point so as to accommodate the usual size cable or other article while locking said cable against removal.

A still further object in view is the provision of a pivotally mounted member for safety hooks including a reciprocating bolt acting as a catch for a locking member for holding articles in place.

In the accompanying drawing:

Figure 1 is a side view of a safety hook disclosing an embodiment of the invention.

Fig. 2 is a sectional view through Fig. 1 on line 2—2.

Referring to the accompanying drawing by numerals, 1 indicates the body of the hook used for lifting heavy weights, or for any other desired purpose, said hook having a notch or recess 2 adjacent the point 3, said recess being formed so as to have a flat shoulder 4 and side walls 5 and 6 whereby the end of bolt 7 cannot move laterally beyond an appreciable distance. The bolt 7 is mounted in a pivotally mounted locking bar 8, said locking bar extending between the projecting bifurcations or shoulders 9 and 10 of the bolt 11, for pivotally mounting the locking bar in place. The locking bar 8 is provided with a straight section 12 engaging a shoulder 13 between the shoulders 9 and 10 while the remaining part of the nut is rounded for allowing pivotal movement as shown in dotted lines in Fig. 1.

The bolt 11 and associate parts are arranged at or near the shank of the hook and may be directly below the eye 14 if desired, or offset therefrom. The body 1 is made so that the center point 15 is in line with the center point 16 of the eye 14 in order to produce a proper strain on the various parts while the locking member is pivotally mounted on the shank of the hook so as to extend across to near the point 3 and leave a substantially usual space for the cable or other article being engaged.

The locking bar 8 is made hollow or provided with a bar 17 for accommodating spring 18, said spring acting against the bolt 7 for normally forcing same outwardly to the position shown in Fig. 1. Bolt 7 is provided with an aperture through which the locking screw or pin 19 extends, said locking screw being preferably threaded at 20 into the sleeve 21 which slidingly fits in the bar 8. In order to admit of a back and forth movement of sleeve 21 slots 22 and 23 are provided in the bar 8 for accommodating the screw or pin 19 as the sleeve moves.

When it is desired to disengage the bolt 7 from engagement with the wall 4 of socket 2 sleeve 21 is grasped and pulled toward the bolt 11 until bolt 7 has been disengaged, thus compressing the spring 18 which will then force the bolt outwardly as soon as the spring is released. This spring maintains the bolt which acts as a catch normally in engagement with wall 4 in socket 2. The locking bar 8 cannot be pushed downwardly without straining some of the parts, though it cannot be moved an appreciable distance further than the center point 15 shown in the drawing, by reason of the straight portion 12.

When the locking bar is in the dotted line position shown in Fig. 1 and it is desired to bring it in position to close the hook, all that is necessary to do is to swing it downwardly or toward the point of the hook when the rounded edge of the bolt 7 will engage the curved surface of the hook so as to force the bolt 7 inwardly against the tension of the spring, and the moment that the bolt clears the wall 4 of the notch the bolt is thrust forwardly so as to engage and positively hold the locking bar in position.

What I claim is:

A safety hook comprising a hook structure having a socket near the point of the hook, a pair of shoulders adjacent the shank opposite the point, each of said shoulders having an opening therethrough, a locking bar having an aperture at one end, said end being fitted between said shoulders, a pin extending through all of said apertures for pivotally connecting the bar with said shoulders, a reciprocating bolt carried by the free end of said bar said bolt having a flat surface arranged to engage one wall of the notch and being provided with a rounded surface arranged to engage the hook for forcing the bolt inwardly, and a spring for forcing the bolt into the notch when the bolt is in registration therewith.

THOMAS NELSON ROBINSON.

Copies of this patent may be obtained for five cents each, by addressing the "Commissioner of Patents, Washington, D. C."